United States Patent [19]

Beavers et al.

[11] Patent Number: 5,442,036
[45] Date of Patent: Aug. 15, 1995

[54] BRANCHED COPOLYESTERS ESPECIALLY SUITABLE FOR EXTRUSION BLOW MOLDING

[75] Inventors: Randy S. Beavers, Kingsport; Karen L. Carman, Morristown; Michael L. Cassell, Kingsport; Joseph F. Knight, Kingsport; James W. Mercer, Kingsport, all of Tenn.

[73] Assignee: Eastman Chemical Company, Kingsport, Tenn.

[21] Appl. No.: 301,090

[22] Filed: Sep. 6, 1994

[51] Int. Cl.$^6$ .............................................. C08G 63/12
[52] U.S. Cl. ............................ 528/296; 528/272; 528/296; 528/300; 528/301; 528/307; 528/308.6; 264/176.1; 264/239
[58] Field of Search ............... 528/272, 296, 300, 301, 528/307, 308.6; 264/176.1, 239

[56] References Cited

U.S. PATENT DOCUMENTS

| | | |
|---|---|---|
| 2,895,946 | 7/1959 | Huffman . |
| 3,406,045 | 10/1968 | Sattler . |
| 3,502,620 | 3/1970 | Caldwell . |
| 3,576,773 | 4/1971 | Vaginay . |
| 3,580,874 | 5/1971 | Nishimura . |
| 4,064,112 | 12/1977 | Rothe et al. . |
| 4,217,440 | 8/1980 | Barkey ........................ 528/274 |
| 4,983,711 | 1/1991 | Sublett et al. ................ 528/272 |
| 5,187,216 | 2/1993 | Cassell et al. ................ 524/261 |

FOREIGN PATENT DOCUMENTS 1027613  4/1966  United Kingdom .

OTHER PUBLICATIONS

United States Defensive Publication T954,005, "Process for Preparing Containers Using Branched Polyesters", Jan. 4, 1977.

*Primary Examiner*—Samuel A. Acquah
*Attorney, Agent, or Firm*—John F. Stevens; Harry J. Gwinnell; Cheryl J. Tubach

[57] ABSTRACT

Disclosed are polyester particles adapted to be extrusion blow molded into articles having improved rheological qualities and a process for producing such particles, said particles comprising a polyester having repeat units from about 40 to 100 mol % terephthalic acid, about 80–98 mol % ethylene glycol, about 0.5–10 mol % 1,4-cyclohexanedimethanol, about 3–10 mol % diethylene glycol, and about 0.05–1.0 mol % of a polyfunctional branching agent, the molecular weight gradient from core to surface of said particles satisfying the following parameters:

(A) number average less than 5500, (B) weight average less than 35,000, and (C) Z average less than 110,000

4 Claims, No Drawings

BRANCHED COPOLYESTERS ESPECIALLY SUITABLE FOR EXTRUSION BLOW MOLDING

TECHNICAL FIELD

The present invention relates to branched copolyesters which, while in the form of a pellet, have a small surface to core molecular weight gradient after having been subjected to solid state polymerization. These copolyesters are especially suitable for extrusion blow molding articles having improved rheological qualities.

BACKGROUND OF THE INFORMATION

Due to environmental considerations, plastic bottle processors are considering alternatives to polyvinyl chloride (PVC) for extrusion blow molding applications. The switch from PVC is being driven by incineration concerns and the lack of a major recycling network. Poly(ethylene terephthalate) [PET]is currently being developed for extrusion blow molding processes. The extrusion blow molding process contains the following steps:

(1) Melting the resin in an extruder
(2) Extrusion of pipe from a die
(3) Forming and trimming the pipe into a preform
(4) Inflation of the preform into a container
(5) Ejection of the container Development of PET for extrusion blow molding applications has been plagued by the need to obtain a polymer with sufficient melt strength to prevent parison sag during bottle formation. In order to obtain a polymer with adequate melt strength, resin suppliers have begun to develop high molecular weight linear polyesters and high molecular weight branched polymers. The high molecular weight resins have very high melt viscosities (60,000–200,000 poise at 265° C.). Processing the viscous polymer into a homogeneous melt that can be blown into bottlers at production rates is a challenge for the extrusion blow molding industry. Typically, slower processing rates or special mixing screws are required to facilitate the extrusion of high melt viscosity polymers without rheological inhomogeneities. The rheological inhomogeneities appear optically as "waves" and/or agglomerates in the bottle sidewalls.

Solid state polycondensation is typically used in the industry to obtain high molecular weight polyesters. The polyesters are normally in the form of a three dimensional figure, such as generally spherical, cubical, cylindrical, etc. During solid state polymerization, the core or portions remote from the surface of a pellet undergo a small change in molecular weight, while the outside surface of the pellet undergoes a significant increase in molecular weight. The pellet surface molecular weight is particularly increased if the polyester is branched with a polyfunctional branching agent. Processing of branched polyesters with large core to surface molecular weight gradients results in containers with many rheological inhomogeneities.

There is considerable literature, such as patents and publications disclosing branched polyesters with polyfunctional branching agents. Such patents include U.S. Pat. Nos. 2,895,946, 3,502,620, 3,406,045, 3,576,773, 3,580,874, 4,217,440 and British 1,027,613. There are patents detailing branched polyesters and copolyesters for processing into bottles. U.S. Defensive Publication T954,005 discloses the use of branching agents to modify polyesters and copolyesters in the melt polymerization to give a polymer with sufficient melt strength for extrusion blow molding applications, but it does not disclose diethylene glycol or the use of solid state polymerization to obtain high molecular weight polymers. U.S. Pat. No. 4,983,711 discloses a class of amorphous copolyesters suitable for extrusion blow molding applications; however, it does not address the use of diethylene glycol, precursor inherent viscosity (I.V.) or the use of solid state polymerization to obtain high molecular weight polyesters suitable for extrusion blow molding applications.

DESCRIPTION OF THE INVENTION

It has now been discovered that polymer precursor I.V. and diethylene glycol (DEG) concentration can be used to minimize the core to surface molecular weight gradient within a pellet of polyesters or copolyesters branched with polyfunctional branching agents. Pellets processed from polyesters and copolyesters having a high precursor I.V. and high DEG concentration may be extrusion blow molded into containers without rheological inhomogeneities. The increase in precursor I.V. from 0.56 dl/g to 0.67 dl/g gives a polymer pellet with a significantly lower core to surface molecular weight gradient after solid state polymerization. As mentioned previously, the core molecular weight increases only slightly during solid state polymerization. Therefore, if the core molecular weight is higher to begin with, the difference between the final core and surface molecular weight will be decreased. The increase in DEG concentration from 1.8 mol % to 7.5 mol % gives a polymer with less crystallinity, which allows easier diffusion of the ethylene glycol (EG) out of the pellet during solid state polymerization. Increasing the diffusivity of EG from the core of the pellet facilitates a lower core to surface molecular weight gradient within a pellet. The present invention provides a new class of branched polyesters and copolyesters that can be extrusion blow molded into bottles without rheological inhomogeneities.

According to the present invention, polyester pellets are provided which are adapted to be extrusion blow molded into articles having improved rheological qualities, the pellets comprising a polyester having repeat units from about 40 to 100 mol % terephthalic acid, about 80–98 mol % ethylene glycol, about 0.5–10 mol % 4-cyclohexanedimethanol, about 3–10 mol % diethylene glycol, and about 0.05–1.0 mol % of a polyfunctional branching agent, the molecular weight gradient from core to surface of the pellets satisfying the following parameters:

(A) number average less than 5500,
(B) weight average less than 35,000, and
(C) Z average less than 110,000.

Also, according to the present invention, a process is provided for producing polyester pellets adapted to be extrusion blow molded into articles having improved rheological qualities, the process comprising (A) forming a polyester precursor in the melt phase by polycondensing monomers to an I.V. of at least 0.60, the monomers comprising about 40 to 100 mol % terephthalic acid, about 80–98 mol % ethylene glycol, about 0.5–10 mol % 1,4-cyclohexanedimethanol, about 3–10 mol % diethylene glycol, and about 0.05–1.0 mol % of a polyfunctional branching agent to form a precursor, (B) solidifying and forming pellets from the precursor, and (C) polycondensing the precursor pellets in the solid state to an I.V. sufficient for extrusion blow molding articles, the molecular weight gradient from core to surface of the pellets satisfying the following parameters;

(1) number average less than 5500, (2) weight average less than 35,000, and (3) Z average less than 110,000.

The polyesters and copolyesters provided by our invention have a precursor I.V. of 0.40 dl/g to 0.80 dl/g with the preferred I.V. being 0.60 dl/g to 0.70 dl/g and are comprised of:

(A) diacid residues comprising 40 to 100 mol % of terephthalic acid;

(B) diol residues comprising 80 to 98 mol % of EG, 0.5 to 10 mol % of 1,4-cyclohexanedimethanol (CHDM) and 3.0 to 10 mol % of DEG residues;

(C) and 0.05 to 1.0 mol % of a polyfunctional branching agent.

The copolyesters according to our invention have been extrusion blow molded into bottles without rheological inhomogeneities. The presence of the polyfunctional branching agent imparts sufficient melt strength for extrusion blow molding of large containers with excellent clarity.

The diacid residues (A) consist of at least 40 mol % preferably 100 mol % of terephthalic acid residues. The remainder of the diacid component (A) may be made up of one or more alicyclic and/or aromatic dicarboxylic acid residues commonly present in polyesters, such as those having 2 to 20 carbon atoms. Examples of such dicarboxylic acids include: 1,2-, 1,3- and 1,4-cyclohexanedicarboxylic acids, 2,6- and 2,7-naphthalenedicarboxylic acid, isophthalic acid and the like. Diacid residues may be derived from the dicarboxylic acids or from ester forming derivatives thereof such as dialkyl esters or acid chlorides.

The diol residues (B) consist of at least 80 mol %, preferably 92 mol % of EG with the remainder of the diol residues consisting of about 0.5 to about 10 mol % of CHDM and about 3 to about 10 mol % of DEG.

The trifunctional branching agent residues (C) may be derived from tri and tetra carboxylic acids or ester forming derivatives thereof such as trimellitic acid (1,2,4-benzenetricarboxylic acid) and anhydride, hemimellitic acid and anhydride (1,2,3-benzenetricarboxylic acid), trimesic acid (1,3,5-benzenetricarboxylic acid) pyromellitic acid and anhydride (1,2,4,5-benzenetetracarboxylic acid) and tricarballyic acid (1,2,3-propanetricarboxylic acid). The trifunctional residue may also be derived from aliphatic triols containing about 3 to 8 carbon atoms such as glycerin. The copolyester contains about 0.05 to about 1.0 mol % of trifunctional monomer with the preferred concentration being in the range of 0.1 to 0.3 mol %. The preferred trifunctional monomers include benzenetricarboxylic acids and anhydrides, especially trimellitic acid and anhydride.

The mole percentages referred to herein are based on 100 mol % (component A plus component C) when component C is a triacid and 100 mol % of component B. The mol % of component B is based on 100 mol % (component B plus component C) when component C is a triol and 100 mol % of component A.

The copolyesters of our invention are prepared using melt polymerization procedures well known in the art for the preparation of low molecular weight polyesters. Solid state polycondensation is used to obtain high polymeric molecular weights. The solid state polycondensation is carried out by heating the solid low molecular weight copolyester (precursor) below its crystalline melting point, but above its glass transition temperature. The process is carried out at 195° C. to 240° C. Under these conditions, the polymer end groups have sufficient mobility for reaction to take place. The reaction by-products are removed by allowing a flow of inert gas to pass over the pellets or by maintaining a reduced pressure. Such processes are well known in the art, as exemplified by U.S. Pat. No. 4,064,112, which is incorporated herein by reference.

The copolyesters are described herein as being in the form of "pellets". By "pellets" we mean any three-dimensional shape as opposed to a two-dimensional shape. Examples of three-dimensional pellets include generally spherical, cubical, cylindrical, etc. In contrast, a two-dimensional shape would include a thin object such as flake or chopped film. By the term "core" of the pellet, we mean portion(s) of the pellet remote from the surface.

The copolyesters described herein are characterized by the following methods:

Inherent Viscosity (I.V.)—A 0.5 g sample of polymer is dissolved in a 60/40 mixture of phenol tetrachloroethane. The I.V. is determined at 25° C. using conventional methods.

Mol % Glycols—The mol % glycols is determined by Gas Chromatography.

Mol % Brancher—The concentration of trifunctional brancher is determined by Liquid Chromatography.

Molecular Weight Gradient—The center of a generally cubical pellet weighing 30 mg ±5 mg is marked using a microscope. The pellet is microtomed to remove ~100 microns from the outside surface of the pellet. Approximately 8 to 12 pellets are microtomed to obtain 4 to 5 mg for the Gel Permeation Chromatography (GPC) analysis. The remaining pellet is microtomed down to the center core on all 4 sides to leave the inner core (0.5 to 1.0 mg). Approximately 6 to 8 pellet cores are needed to give sufficient material for the GPC analysis. The outside surface of the pellet and the inner core are characterized for molecular weight distribution by GPC using a two column mixed set. The difference between the surface molecular weight and the core molecular weight is referred to herein as:

(A) delta number average molecular weight ($\Delta Mn$)

(B) delta weight average molecular weight ($\Delta Mw$)

(C) delta z-average molecular weight ($\Delta Mz$)

Bottle Quality Rating—The bottle sidewall quality of each of the samples is compared with the rest of the samples. The following rating criteria is used to assign differences in the quality of the materials.

| Agglomerates | Waves |
| --- | --- |
| 0 = None | NW = No Waves |
| 1 = Few | LW = Low Waves |
| 2 = Moderate | MW = Moderate Waves |
| 3 = Many | HW = High Waves |

The agglomerates are due to a melt viscosity mismatch introduced by the pellet surface to core molecular weigh gradient within a pellet. The copolyesters disclosed herein are extrusion blow molded into containers with a quality rating of 0, NW (no agglomerates and no wave) because they have a composition which facilitates a significant decrease in the pellet core to surface molecular weight gradient. The synergism obtained by having a branched copolyester with a higher precursor I.V. and a higher DEG concentration gives a polymer that is processed into containers with good melt quality without the need for special processing screws or extruders. Acceptable containers may be produced from polymers with an agglomerate rating of 1 by increasing the extrusion residence time or utilizing special mixing screws; however, both of these options are undesirable to resin processors. Polymers with an agglomerate rating greater than 1 cannot be processed into bottles without agglomerates using longer extruder residence times and/or mixing screws.

The bottle sidewalls are evaluated for waves to help distinguish minor differences in bottle quality. The waves appear as flow lines in the bottle sidewall because the melt has not been homogenized during extrusion. A quality rating of no wave or low waves is required for acceptable containers.

EXAMPLES

The following table summarizes data which illustrates our invention.

an I.V. of 0.879 dl/g. Bottles obtained from this copolyester have a quality rating of 3, MW (many agglomerates and moderate wave). Characterization of the pellets after solid state polymerization for surface to core molecular weight gradient give a $\Delta Mn$ of 7240 g/mol, $\Delta Mw$ of 43300 g/mol and a $\Delta Mz$ of 135900 g/mol. The high molecular weight gradient is due to the low concentration of DEG which reduced the efficient removal of EG from the inside of the pellet during solid state polymerization.

Example 2: Higher DEG Concentration—A precursor I.V. of 0.641 dl/g is obtained in a continuous melt phase reactor. Characterization of the precursor shows that it was PET with 4.28 mol % of DEG, 3.50 mol % of CHDM and 0.18 mol % of TMA. The sample is solid state polymerized to an I.V. of 0.900 dl/g. Bottles Obtained from this resin have a quality rating of 1, MW (few agglomerates and a moderate amount of waves). The surface to core molecular wight gradient analysis shows that it has a lower molecular weight gradient than the polymer in Example 1 ($\Delta Mn$ of 3865 g/mol, $\Delta Mw$ of 26760 g/mol and a $\Delta Mz$ of 85850 g/mol).

| Example | Prec. I.V. dl/g | SS I.V. dl/g | DEG Mol % | CHDM Mol % | TMA Mol % | $\Delta Mn$ g/mol | $\Delta Mw$ g/mol | $\Delta Mz$ g/mol | Bottle Quality |
|---|---|---|---|---|---|---|---|---|---|
| 1 | 0.633 | 0.879 | 1.66 | 3.45 | 0.21 | 7240 | 43300 | 135900 | 3, MW |
| 2 | 0.641 | 0.9 | 4.28 | 3.5 | 0.18 | 3865 | 26760 | 85850 | 1, MW |
| 3 | 0.683 | 0.921 | 4.39 | 3.5 | 0.18 | 4224 | 26524 | 76875 | 1, LW |
| 4 | 0.577 | 0.873 | 1.78 | 6.3 | 0.2 | 8530 | 47070 | 141930 | 3, HW |
| 5 | 0.653 | 0.881 | 3.23 | 7.9 | 0.21 | 5495 | 35102 | 104375 | 2, HW |
| 6 | 0.568 | 0.892 | 7.54 | 4.2 | 0.19 | 3970 | 23360 | 64200 | 0, NW |
| 7 | 0.599 | 0.905 | 8.46 | 0 | 0.24 | 3964 | 29255 | 93700 | 1, NW |
| 8 | 0.641 | 0.894 | 7.78 | 7.6 | 0.22 | 3167 | 28045 | 87010 | 1, LW |

Prec. I.V. = Precursor I.V.
SS I.V. = I.V. after Solid State Polymerization
DEG = Diethylene Glycol
CHDM = 1,4-Cyclohexanedimethanol
TMA = Trimellitic Anhydride
$\Delta Mn$ = Number average molecular weight difference from pellet surface to core
$\Delta Mw$ = Weight average molecular weight difference from pellet surface to core
$\Delta Mz$ = z-average molecular weight difference from pellet surface to core Polymer Preparation—The copolyesters in Examples 1-8 are prepared in a continuous melt phase reactor using conventional techniques. The polyesters are catalyzed with 0.0090 wt % of phosphorus ester of ethylene glycol and 2-ethylhexanol, 0 0210 wt % of antimony trioxide, 0.0085 wt % of cobalt diacetate, 0.0075 wt % of manganese diacetate, and 0.0020 wt % of acetyl triisopropyl titanate based on the pounds of polymer prepared. The precursor I.V.s are shown in Table 1. The precursors are charged to a batch rotary double-coned Patterson dryer for solid state polymerization. Solid state polymerization is carried out at 205° C. using a nitrogen purge of 4 SCFM. Batches of 300–600 pounds are solid state polymerized in the dryer with tumbling. Samples were taken every 2 hours for I.V. analysis to monitor the extent of solid state polycondensation.

Bottle Processing—A 80 mm Bekum 121 extrusion blow molding machine fitted with a high density polyethylene screw with a pineapple mixer and an 18 ounce wide mouth bottle mold is used to produce bottles. The blow molding trials are carried out using a screw speed of 15 rpm and a melt temperature of 280° C. ±10° C.

Example 1: Low DEG Concentration—Melt phase polymerization is carried out to give a precursor with an I.V. of 0.633 dl/g. Characterization of the precursor shows that it consisted of PET with 1.66 mol % of DEG, 3.45 mol % of CHDM and 0.21 mol % of trimellitic anhydride. The sample is solid state polymerized to Increasing the DEG concentration from 1.66 mol % (Example 1) to 4.28 mol % gives a significantly lower molecular weight gradient within a pellet, which produces good quality bottles.

Example 3: Higher Precursor I.V.—This sample is melt phase polymerized to an I.V. of 0.683 dl/g. Characterization of the precursor shows that it is PET with 4.39 mol % of DEG, 3.50 mol % of CHDM and 0.18 mol % of TMA. The sample is solid state polymerized to an I.V. of 0.921 dl/g. Containers produced from this resin have a quality rating of 1, LW (few agglomerates and low waves). The core to surface molecular weight gradient gives a $\Delta Mn$ of 4224 g/mol, $\Delta Mw$ of 26624 g/mol and a $\Delta Mz$ of 76875 g/mol. The increase in precursor I.V. from 0.641 dl/g to 0.683 dl/g gives a lower molecular weight pellet gradient than Example 2.

Example 4: Low Precursor I.V. and High CHDM Concentration—The PET copolyester is melt phase polymerized to an I.V. of 0.577 dl/g with a lower level of DEG (1.78 mol %) and a higher CHDM concentration (6.30 mol %) to ascertain if the addition of CHDM helps reduce the surface to core molecular weight gradient. The sample contains 0.20 mol % of TMA. The copolyester is solid state polymerized to an I.V. of 0.873 dl/g. The pellet surface to core molecular weight analysis shows that the pellets contain a significantly higher molecular weight gradient than Examples 2 and 3. The sample has a $\Delta Mn$ of 8530 g/mol, a $\Delta Mw$ of 47070 g/mol and a ΔMz of 141930 mol/g. Extrusion blow molding of bottles from this sample gives containers with a quality rating of 3, MW (many agglomerates and a high concentration of waves). This example illustrates that CHDM, unlike DEG does not facilitate the removal of EG within a pellet to give a low surface to core molecular weight gradient.

Example 5: High Precursor and High CHDM Concentration—The copolyester of PET with 0.21 mol % of TMA, 3.23 mol % of DEG and a slightly higher concentration of CHDM (7.90 mol %) than Example 4 is prepared in the melt phase reactor to an I.V. of 0.653 dl/g. The sample is solid state polymerized to an I.V. of 0.881 dl/g. Characterization of the surface to core molecular weight gradient by GPC shows that the material has a ΔMn of 5495 g/mol, a ΔMw of 35102 g/mol and a ΔMz of 104375 g/mol. This resin has a significantly lower surface to core molecular weight gradient than Example 4, because of the higher precursor I.V. and higher DEG concentration. Bottles extrusion blow molded from this resin has a quality rating of 2, HW (moderate amount of agglomerates and a high concentration of waves).

Example 6: Low Precursor I.V. and High DEG Concentration—This sample is synthesized to an I.V. of 0.568 dl/g. Characterization shows that the sample is PET with 0.19 mol % of TMA, 7.54 mol % of DEG and 4.2 mol % of CHDM. The copolyester was solid state polymerized to an I.V. of 0.892 dl/g. Characterization of the surface to core molecular weight shows that the pellets contain a very small gradient (ΔMn of 3970 g/mol, ΔMw of 23360 g/mol and a ΔMz of 64200 g/mol). The material is extrusion blown into 18-ounce containers with excellent clarity. The bottles have a quality rating of 0, NW (no agglomerates and no waves). This sample demonstrates the significant effect of DEG on reducing the pellet surface to core molecular weight gradient. Even though this resin has a low precursor I.V., the high concentration of DEG produces a pellet with a low surface to core molecular weight gradient after solid state polycondensation.

Example 7: High DEG Concentration and No CHDM—A PET copolyester with 8.46 mol % of DEG and 0.24 mol % of TMA is synthesized to an I.V. of 0.619 dl/g. This sample does not contain CHDM. The sample is solid stated to an I.V. of 0.904 dl/g. Characterization of the surface to core molecular weight gradient shows that it had a ΔMn of 3964 g/mol, a ΔMw of 29255 g/mol and a ΔMz of 82135 g/mol. The resin is extrusion blow molded into 18-ounce bottles with a quality rating of 1, NW (few agglomerates and no waves). The bottles contain an unacceptable level of crystallinity in the pinch-off of the bottle. This example illustrates that CHDM is not needed in the composition to give a bottle with acceptable bottle sidewall quality; however, CHDM is needed to slow the crystallization rate of the polymer to give a container without crystallinity in the pinch-off.

Example 8: High DEG and CHDM Concentrations—This copolyester is prepared to a meltphase I.V. of 0.641 dl/g. Characterization showed that it was PET with 7.78 mol % of DEG, 7.60 mol % of CHDM and 0.22 mol % of TMA. The resin is solid state polycondensed to an I.V. of 0.894 dl/g. Characterization of the surface to core molecular weight gradient shows that it contained a ΔMn of 3167 g/mol, a ΔMw of 28045 and a ΔMz of 87010 g/mol.

Extrusion blow molding of this material gives bottles with a quality rating of 1, LW (few agglomerates and a low concentration of waves). As can be seen by comparing this resin with Example 2, doubling the CHDM concentration does not significantly affect the surface to core molecular weight gradient.

Conventional additives commonly used in polyesters may, of course, be used in the copolyesters of this invention.

The invention has been described in detail with particular reference to preferred embodiments thereof, but it will be understood that variations and modifications can be effected within the spirit and scope of the invention.

We claim:

1. Polyester particles adapted to be extrusion blow molded into articles having improved rheological qualities, with said particles being formed from a polyester precursor in the melt phase having an I.V. of at least 0.60 dl/g and said polyester consisting essentially of repeat units from about 40 to 100 mol % terephthalic acid, about 80–98 mol % ethylene glycol, about 0.5–10 mol % 1,4-cyclohexanedimethanol, about 3–10 mol % diethylene glycol, and about 0.05–1.0 mol % of a polyfunctional branching agent, the molecular weight gradient from core to surface of said particles satisfying the following parameters:

(A) number average less than 5500,
(B) weight average less than 35,000, and
(C) Z average less than 110,000.

2. Polyester particles according to claim 1 wherein the repeat units from diethylene glycol are present in an amount of about 3–6 mol %.

3. Polyester particles according to claim 1 wherein the polyfunctional branching agent is trifunctional or tetrafunctional.

4. Polyester particles according to claim 1 wherein the repeat units from 1,4-cyclohexanedimethanol are present in an amount of about 3–10 mol %.

* * * * *